(12) United States Patent
Dees et al.

(10) Patent No.: US 11,889,946 B2
(45) Date of Patent: Feb. 6, 2024

(54) HEATING DEVICES AND APPARATUS

(71) Applicant: Koninklijke Douwe Egberts B.V., Utrecht (NL)

(72) Inventors: Hendrik Johan Dees, Utrecht (NL); Abram Christiaan Knip, Nieuw-Vennep (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 124 days.

(21) Appl. No.: 16/640,046

(22) PCT Filed: Aug. 23, 2018

(86) PCT No.: PCT/EP2018/072729
§ 371 (c)(1),
(2) Date: Feb. 18, 2020

(87) PCT Pub. No.: WO2019/042851
PCT Pub. Date: Mar. 7, 2019

(65) Prior Publication Data
US 2020/0221899 A1 Jul. 16, 2020

(30) Foreign Application Priority Data
Sep. 1, 2017 (GB) .................................... 1714045

(51) Int. Cl.
| | | |
|---|---|---|
| *A47J 31/46* | (2006.01) | |
| *A47J 31/54* | (2006.01) | |
| *A47J 31/56* | (2006.01) | |
| *F24H 1/12* | (2022.01) | |
| *F24H 1/14* | (2022.01) | |

(52) U.S. Cl.
CPC ............ *A47J 31/469* (2018.08); *A47J 31/542* (2013.01); *A47J 31/467* (2013.01); *A47J 31/56* (2013.01); *F24H 1/121* (2013.01); *F24H 1/142* (2013.01)

(58) Field of Classification Search
CPC ...... A47J 31/467; A47J 31/469; A47J 31/542; A47J 31/56; F24H 1/121; F24H 1/142
See application file for complete search history.

(56) References Cited

U.S. PATENT DOCUMENTS

| | | |
|---|---|---|
| 2,129,300 A | 9/1938 | Bichowsky |
| 2011/0259203 A1 | 10/2011 | Mograbi |

(Continued)

FOREIGN PATENT DOCUMENTS

| | | |
|---|---|---|
| CN | 203719101 | 7/2014 |
| EP | 0342516 | 11/1989 |

(Continued)

OTHER PUBLICATIONS

PCT; Appl. No. PCT/EP2018/072729; International Search Report and Written Opinion dated Nov. 8, 2018 (13 pgs.).

(Continued)

*Primary Examiner* — Justin C Dodson
(74) *Attorney, Agent, or Firm* — Fitch, Even, Tabin & Flannery LLP (57) ABSTRACT

The invention provides a heating device comprising a base structure comprising a fluid channel and a heating element, the heating element arranged in use to heat fluid within the fluid channel, the heating device further comprising a cooling means, arranged in use to cool the fluid channel.

20 Claims, 5 Drawing Sheets

(56) References Cited

U.S. PATENT DOCUMENTS

| | | | | |
|---|---|---|---|---|
| 2012/0195577 A1* | 8/2012 | Lee | F24D 17/0031 | |
| | | | | 392/449 |
| 2012/0295001 A1* | 11/2012 | Nijboer | A47J 31/40 | |
| | | | | 99/275 |
| 2013/0168379 A1* | 7/2013 | Deenen | F24C 7/067 | |
| | | | | 228/262.9 |
| 2015/0053373 A1* | 2/2015 | Heung | F28D 7/0016 | |
| | | | | 165/61 |
| 2015/0374168 A1* | 12/2015 | Sampoli | A47J 31/002 | |
| | | | | 426/433 |
| 2016/0095466 A1* | 4/2016 | Hsu | A47J 31/4403 | |
| | | | | 99/287 |

FOREIGN PATENT DOCUMENTS

| | | |
|---|---|---|
| EP | 2362170 | 8/2011 |
| GB | 2481217 | 12/2011 |
| JP | 2008117035 | 5/2008 |
| KR | 20130036026 | 4/2013 |
| WO | 2005080885 | 9/2005 |
| WO | 2008127113 | 10/2008 |

OTHER PUBLICATIONS

UKIPO; Appl. No. GB1714045.0; Search Report Under Section 17(5) dated Mar. 7, 2018 (5 pgs.).

* cited by examiner

HEATING DEVICES AND APPARATUS

CROSS REFERENCE TO RELATED APPLICATIONS

This application is a U.S. national phase application of International Application No. PCT/EP2018/072729, filed Aug. 23, 2018, which claims benefit from United Kingdom Application 1714045.0, filed Sep. 1, 2017, which are each hereby incorporated herein by reference in their entirety.

TECHNICAL FIELD OF THE INVENTION

The present invention relates heating devices, in particular heating elements comprising a heating element and a cooling means, arranged in use to cool the heating element. The present invention further relates to a method of cooling a heating element of the heating device; a beverage preparation apparatus comprising a heating device; and a method of preparing one or more beverages.

BACKGROUND TO THE INVENTION

Flow through low thermal mass heaters (hereinafter "FTH") are used in several appliances, particularly kitchen appliances, for instance water kettles and brewing devices such as coffee machines, for an instantaneous supply of heated liquid for the preparation of a beverage. Known flow through thermal mass heaters may have a non-linear liquid flow channel operably connected to a heating element to heat a liquid within the channel when a supply of hot liquid is required. In beverage preparation appliances incorporating such heating devices, such as coffee and/or hot chocolate appliances, a liquid (usually water or milk) may be heated in an efficient and rapid way, giving the user the advantage of enabling brewing or preparing several beverages consecutively, without having to wait for the water and/or milk to warm up after each beverage.

Relatively recently there has been an increase in the consumption of cold beverages either at home or out of home. This has resulted in an increased demand from consumers, especially for domestic consumption, for appliances which allow the consumer to prepare alternately hot and cold beverages.

Known appliances of the type described above have the disadvantage that when dispensing a cold beverage after a hot beverage has been prepared, residual heat from the heated fluid channel may be transferred to the cold beverage. This may result in a poor quality of the cold beverage such as, for example, development of off-flavour and/or undesirable beverage temperature. In fact, although flow through low thermal mass heaters are effective in reducing the time for heat dissipation, nevertheless their mass, even though low, retains residual heat after heating a liquid for a beverage.

To overcome this drawback, appliances have been developed which include bypass valves which are activated when cold beverages are required by the consumer. In order for the cold beverage liquid to bypass the heated fluid channel of the FTH, an alternative channel path is used; this path is dedicated to the cold liquid beverage only and is operated by using the bypass valves.

Nevertheless, these kinds of appliances which comprise a FTH which incorporates a heated fluid channel path and a dedicated separate cold fluid channel path controlled by valves have a number of disadvantages including being expensive, adding complexity to the system (resulting in an increased likelihood of malfunctions) and cleaning difficulties because of the use of multiple valves, which results in poor hygienic control. Particularly, appliances which include bypass valves show a lower reliability as the valves are prone to clogging and failure, especially when used with milk, and this consequently results in an increased cost for the consumer.

In this context, the ability to remove residual heat from FTH and in particular from the heated fluid channel thereof, in order to prepare a cold beverage through the same channel soon after having brewed a hot beverage, would be advantageous.

It would therefore be advantageous to provide an appliance with which a consumer could prepare alternating hot and cold beverages through the same fluid channels within a heating device, potentially saving space on the kitchen shelf.

It would be further advantageous if a consumer could prepare alternating hot and cold beverages without having to wait for fluid channels within an appliance to cool down after dispensing a hot beverage, speeding up the preparation of a cold beverage.

It would be further advantageous if residual heat could be promptly removed from heating devices such as FTH after preparing a hot beverage, in order to dispense a cold beverage at the correct temperature with an improved cup quality.

It would be further advantageous if bypass valves could be eliminated from known heating devices of the appliances described hereinabove, resulting in a less complex, more compact, more hygienic and/or more reliable system.

It would be further advantageous if a cooling means could be provided which is fully separated from the heated fluid channel, so that several types of coolant may be used, to potentially increase the cooling power and speed up the cooling rate.

It would be further advantageous if heat could be transferred from the heated fluid channel and this residual heat used to aid in raising the temperature of a liquid intended for further heating, in order to save heating energy, resulting in more environmentally friendly devices.

It is therefore an aim of embodiments of the invention to satisfy the highly-felt need of an optimised heating device such as a FTH and/or to overcome or mitigate at least one problem of the prior art whether disclosed herein or not.

SUMMARY OF THE INVENTION

According to the first aspect of the invention there is provided a heating device comprising a base structure comprising a fluid channel and a heating element, the heating element arranged in use to heat fluid within the fluid channel, the heating device further comprising a cooling means, arranged in use to cool the fluid channel.

The use of integral cooling means within a base structure of a heating device, such as a FTH, overcomes one or more of the disadvantages of the known systems described hereinabove. By incorporating a cooling means which, in use, cools the material of the heated fluid channel per se, the heating devices of the first aspect of the invention allow the alternating preparation of hot and cold beverages through the same heating device without using bypass valves, resulting in beverage quality of a higher standard and speeding up the preparation of a cold beverage without waiting for the system to cool down after having prepared a hot beverage. The use of a cooling means to cool the fluid channel after dispensing of a hot beverage also increases the overall hygiene of the heating device, by ensuring that the fluid channel is maintained at a lower temperature for longer periods of time, which makes the environment within the fluid channel less conducive to bacterial or other microorganism growth.

The fluid channel may extend through the base structure or may be extend on one or more surfaces thereof. The fluid channel may comprise metal, alloy or any other suitable thermally conductive material.

In some embodiments, the heating element at least partially matches the fluid channel path formed by the at least one fluid channel, and may fully match the fluid channel path of the fluid channel.

Preferably the base structure comprises a plate-like structure and which may comprise a thermally conductive material through which heat is exchanged between the fluid channel and the cooling means.

In a preferred embodiment, the cooling means comprises a cooling channel. The cooling channel may be arranged in use to cool the fluid channel when the fluid channel is substantially free of heated fluid or fluids, and preferably substantially free of heated liquid or liquids.

In some embodiments, the cooling channel may be located above or below the fluid channel. Preferably at least part of the cooling channel may be adjacent to at least one side of the at least a part of the fluid channel and preferably at least part of the cooling channel may be adjacent to at least two different sides of at least a part of the fluid channel. In some embodiments, at least part of the cooling channel may be adjacent and spaced apart from at least one side of the at least part of the fluid channel, preferably at least two sides. In some embodiments, the fluid channel is adjacent, and preferably spaced apart from, the whole of at least one side, and preferably two sides, of the fluid channel.

In some embodiments, at least part of the cooling channel may abut or contact at least one side of at least a part of the fluid channel, or at least part of the cooling channel may further abut or contact at least two different sides, preferably opposite sides, of the at least a part of the fluid channel. In some embodiments, the fluid channel abuts or contacts the whole of at least one side, and preferably two sides, of the fluid channel; and thereby may extend contiguously alongside one or more sides of the fluid channel.

In a preferred embodiment, at least a part of the fluid channel and at least apart of the cooling channel are arranged in an alternating pattern across or through or on at least part of the base structure. Preferably at least a part of the fluid channel and at least a part of the cooling channel are non-linear. At least part of the fluid channel and at least part of the cooling channel may preferably comprise a shape selected from spiral, undulating, labyrinthine, boustrophedonic, and zig zag, or any combination thereof.

In some embodiments, in use, the fluid within the fluid channel and the fluid within the cooling channel may flow in the same or opposite direction. Preferably in use, the fluid within the fluid channel may comprise a liquid and/or a gas, particularly water and/or milk. Preferably, in use, the fluid within the cooling channel may comprise a liquid.

According to the second aspect of the invention there is provided a method for cooling the fluid channel of a heating device of the first aspect of the invention comprising the steps of conveying heated fluid through the fluid channel; and using the cooling means to cool the fluid channel.

In a preferred embodiment, the cooling means of the heating device comprises a cooling channel the method may further comprise the step of conveying a cooling fluid through the cooling channel to cool the fluid channel via heat transfer.

In some embodiments, the method may comprise the step of substantially emptying the heated fluid from the fluid channel before using the cooling means to cool the fluid channel. The method may comprise substantially emptying the fluid channel of heated liquid, and optionally also vapour.

In some embodiments, the method may further comprise the step of recycling the cooling fluid after the cooling fluid passes through the cooling channel. Cooling fluid which has absorbed residual heat from the heated fluid channel, and thus which has an elevated temperature compared to the original cooling fluid, may be used, for example, as a fluid for subsequent conveyance through the fluid channel. As the cooling fluid has absorbed heat and the temperature thereof is raised, compared to the unheated cooling fluid, then passing the heated cooling fluid through the fluid channel reduces the time required to heat the fluid in the fluid channel to the desired temperature.

Preferably the step of conveying the fluid within the cooling channel may comprise a first cooling step wherein the cooling fluid is at a temperature at no more than at ambient temperature and preferably no more than 25° C. In some embodiments, the cooling fluid is at a temperature of between 30° C. and 10° C., such as between 25° C. and 15° C.

In a preferred embodiment, the step of conveying the fluid within the cooling channel may further comprise a second cooling step wherein the cooling fluid is at a temperature of no more than 10° C. and preferably no more than 5° C. The cooling fluid used in the second cooling step may be at a temperature of between 1° C. and 12° C. such as between 2° C. and 10° C. or between 3° C. and 8° C., or around 4° C.

In some embodiments, the cooling fluid may be recycled. Preferably the heat absorbed by the cooling fluid may be used to heat a further fluid, or the heated cooling fluid may be recycled or used as a heating fluid.

In some embodiments, the cooling channel path may comprise a dedicated path separated from the fluid channel path. Within the dedicated cooling channel path a coolant fluid such as for example glycol and/or water and or any combination thereof may be used, speeding up the cooling rate of the cooling channel.

According to the third aspect of the invention there is provided a beverage preparation apparatus comprising a heating device of the first aspect of the invention.

Preferably the apparatus is a brewed beverage preparation apparatus, such as a coffee-making apparatus, for example.

The apparatus may comprise one or more fluid tanks, such as a beverage liquid tank (which may be water or milk, for example), a cooling fluid tank or refrigerator and a recycled cooling fluid tank, for example.

The apparatus may comprise one or more ingredient hoppers or containers, such as ground or instant coffee or hot chocolate containers.

The apparatus may be an on-demand beverage apparatus and may comprise one or more enclosures for the insertion of pods, capsules or other devices containing beverage ingredients, for example.

According to a fourth aspect of the invention there is provided a method of preparing one or more beverages comprising the steps of: heating a beverage fluid in the fluid channel of the heating element of the beverage preparation apparatus of the third aspect of the invention; conveying the heated beverage fluid from the fluid channel; cooling the fluid channel; and optionally passing a further fluid through the fluid channel.

In some embodiments, the method may include the step of inserting a pod, a capsule or other device containing beverage ingredients into one or more enclosure and conveying the heated beverage through the pod, capsule or device for the ingredients to be extracted and/or dissolved.

Cooling the heated fluid channel may comprise conveying a cooling fluid through the cooling channel, wherein the fluid has a temperature of no more than ambient temperature and preferably no more than 25° C.

In a preferred embodiment, the method may further comprise a second cooling step wherein a cooling fluid is conveyed through the cooling channel at a temperature of no more than 10° C. and preferably no more than 5° C.

In some embodiments, the cooling fluid may be recycled and may be subsequently used as the beverage fluid, for example. The heat absorbed by the cooling fluid from the fluid channel may be used to heat a further fluid.

In a preferred embodiment, the method may further comprise the step of passing a second liquid through the fluid channel for the preparation of a further beverage. The second liquid may be unheated or heated.

The method may further comprise the step of dispensing the beverage into a cup and/or mug or any other beverage container.

DETAILED DESCRIPTION OF THE INVENTION

In order that the invention may be more clearly understood, embodiments thereof will now be described, by way of example only, with reference to the accompanying drawings of which.

Referring to the following Figures like numbers describe like components.

Figure 1:
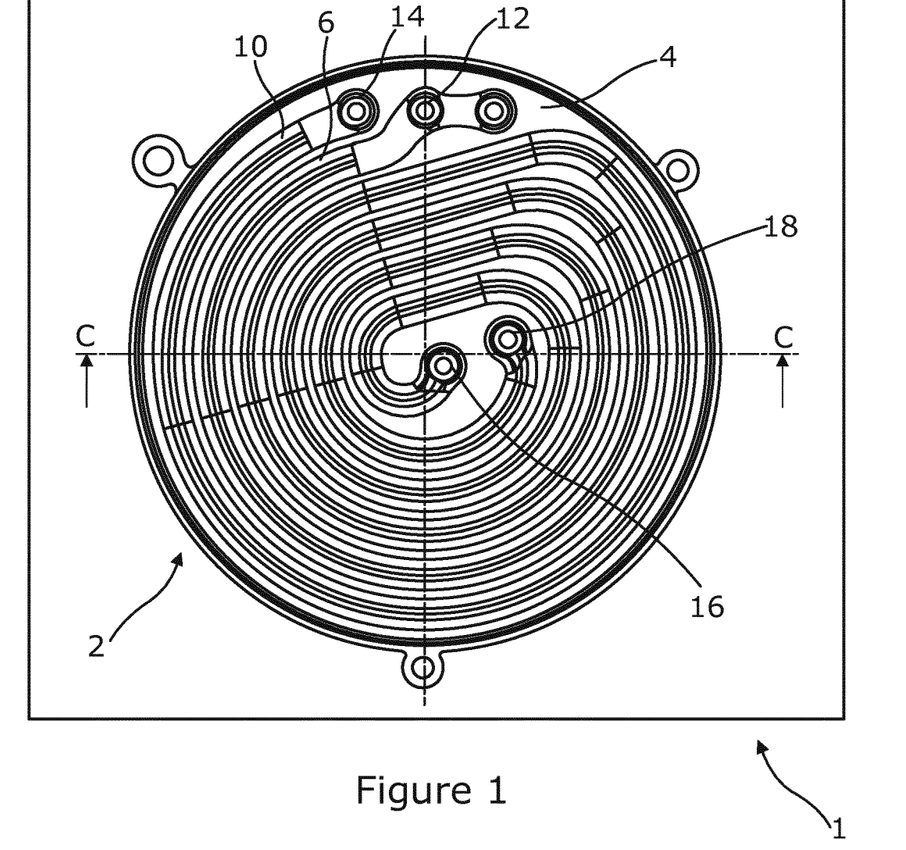
FIG. 1 illustrates a top-down view of a first embodiment of a heating device according to the invention.
Figure 2:
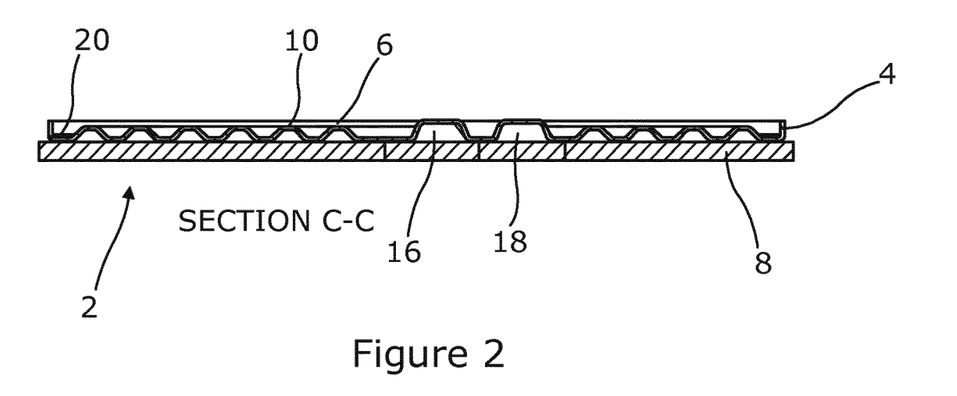
FIG. 2 illustrates a cross sectional view along line C-C of the first embodiment of FIG. 1.

Referring firstly to FIG. 1 and FIG. 2 an embodiment of a heating device (2) according to the invention, for use in a beverage preparation apparatus, is shown. A flow through thermal heating device ("FTH") (1) comprises a heating device (2) comprising a base structure in the form of a plate-like structure (4). The heating device (2) comprises within the plate-like structure (4) a fluid channel (6) for flow of a heating fluid (not shown) through the FTH (1) and a cooling means in the form of a cooling channel (10) for flow of a cooling fluid (not shown) through the FTH (1) when cooling of the fluid channel (6) is required by the system in order to prepare a cold beverage after having dispensed a hot beverage. Furthermore, the heating device (2) comprises heating means in the form of a heating element (8) which is located below and in close proximity to the fluid channel (6) in order to exchange heat with the fluid channel (6) through direct and/or indirect contact. The heating element (8) may match the fluid channel (6) path or may partially match the fluid channel (6) path.

In a further arrangement of the first embodiment, the heating means (8) may be above and in close proximity to the fluid channel (6) rather than below it.

The plate-like structure (4) is formed of thermally conductive material to allow heat exchange between the components of the plate-like structure (4) such as for example the fluid channel (6) and the heating element (8); and/or the fluid channel (6) and the cooling channel (10); and/or the fluid channel (6) and the heating fluid (not shown); and/or the cooling channel (10) and the cooling fluid (not shown).

The capacity of the cooling channel is in the range between 2 to 5 $cm^3$, but in alternative embodiments the capacity may be higher or lower, and the exact capacity will depend on the type of apparatus the heating device (2) will be used in.

The fluid channel (6) and the cooling channel (10) of the embodiment of FIGS. 1 and 2 comprise a shaped channel pattern/path with a substantially spiral shape.

In an alternative arrangement of the first embodiment the channel path may include further shapes such as for example undulating, labyrinthine, boustrophedonic, and zig-zag or any combination thereof.

In a further arrangement of the first embodiment in any of these different configurations (undulating, labyrinthine, boustrophedonic, and zig-zag) the channel patterns/paths of the fluid channel (6) and of the cooling channel (10) may lie adjacent to each other along the entire length of the channel patterns/paths or alternatively for only a part of their length.

In the embodiment shown in FIG. 1, the path of the fluid channel (6) and the cooling channel (10) are adjacent to each other along the entire channel path and substantially spaced apart along the entire length. In this conformation, both lateral sides of the fluid channel (6) are adjacent to the cooling channel (10) along substantially the whole length of the fluid channel (6).

In an alternative arrangement, the channel paths may lie adjacent to each other and be substantially spaced a part for the entire length of the two channels (6, 10) or only for part of the length of the two channels (6, 10).

In a further arrangement of the embodiment, the fluid channel (6) may abut or be in contact with at least one side of the cooling channel (10) along the entire length of the two channels (6, 10).

In a further arrangement, the fluid channel (6) may abut or be in contact with at least one side of the cooling channel (10) along only part of the length of the two channels (6, 10).

In the embodiment of FIGS. 1 and 2, the fluid channel (6) comprises a fluid channel inlet (12) and a fluid channel outlet (16) and the cooling channel (10) comprises a cooling channel inlet (14) and a cooling channel outlet (18). The inlets (12, 14) lie in the region of the external edge/border of the upper surface (20) of plate-like structure (4). The outlets (16, 18) lie substantially at the centre of the upper surface (20) of the plate-like structure (4). This allows the manufacturer to easily connect inlets and outlets to the hydraulic circuit (not shown) of the FTH (1), Alternatively, in a further arrangement not shown, the inlets (12, 14) and the outlets (16, 18) may have a switched position on the plate-like structure (4), so that the inlets (12, 14) may lie at the centre of the upper surface (20) of the plate-like structure (4) and the outlets (16, 18) may lie in the region of the external edge/border of the upper surface (20) of plate-like structure (4).

Figure 3:
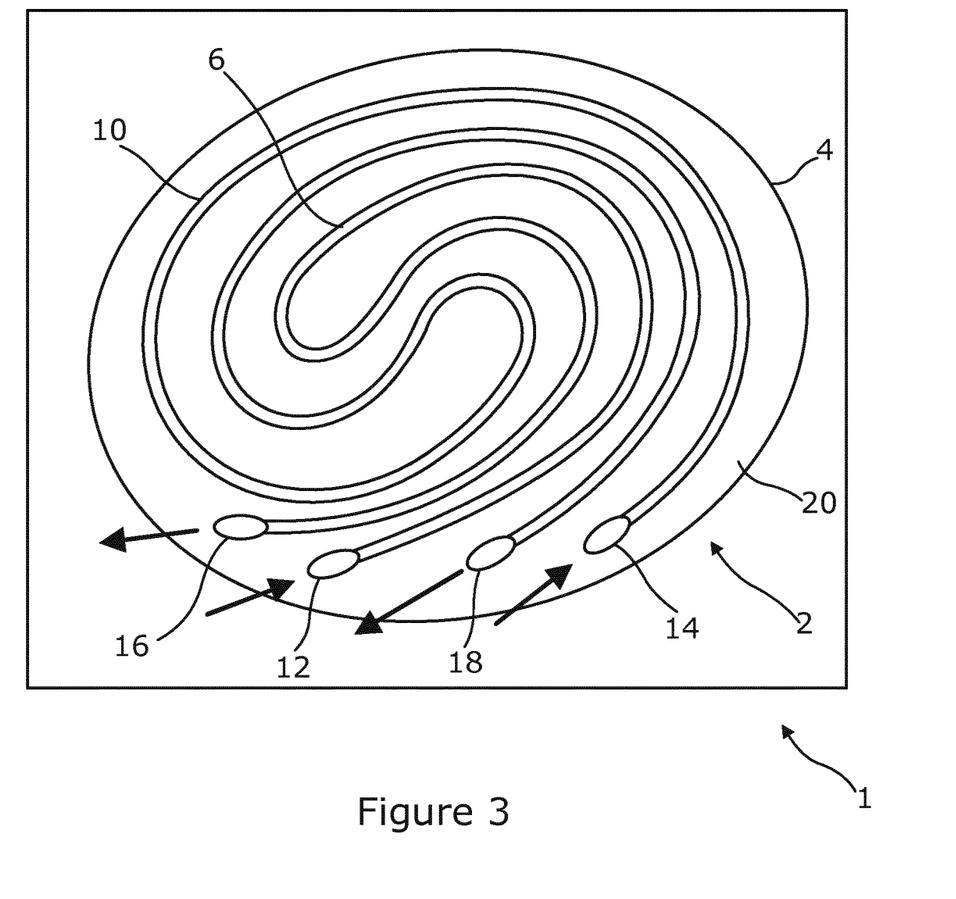
FIG. 3 illustrates a top-down view of a second embodiment of a heating device according to the invention.

Referring now to FIG. 3, a second embodiment of a heating device (2) according to the invention is shown, which is similar to the embodiment of FIGS. 1 and 2, and like numerals represent like components. The heating device (2) comprises a base structure in the form of a plate-like structure (4). Within the plate-like structure a fluid channel (6) and a cooling channel (10) extend slightly spaced apart and in a spiral-shaped channel path. In contrast to the embodiment of the heating device (2) of FIGS. 1 and 2, the heating device (2) of FIG. 3 is configured such that along the length of the fluid channel (6) the cooling channel (10) extends adjacent to a single side only of the fluid channel (6), along the entire length of the fluid channel (6).

In a further arrangement of the second embodiment of FIG. 3 the two channels (6, 10) may be adjacent and in contact along only one side of their length for at least part or all of the length of the channels (6,10).

The fluid channel inlet (12), the fluid channel outlet (16), the cooling channel inlet (14) and the cooling channel outlet (18) of the second embodiment lie in close proximity to each other and adjacent to the external edge/border of the upper surface (20) of plate-like structure (4). This allows ease of connection to the hydraulic circuit (not shown) of the FTH (1), being inlets (12, 14) and outlets (16, 18) all in the same area and on the same side of the plate-like structure (4), thereby making the heating device (2) more simple to manufacture and install.

In use, the heating devices (2) of any of the embodiments described for FIGS. 1-3 are used in a beverage preparation apparatus. An operator can readily prepare a hot beverage by activating the FTH (1). A heating fluid (not shown) is sent at a flow rate in the range between 1 to 20 ml/s from the fluid channel inlet (12), through the fluid channel (6), to the fluid channel outlet (16). Meanwhile, the heating element (8) is activated by the user (selecting a hot beverage as his/her choice) which then exchanges heat with the fluid channel (6), allowing the fluid (not shown) flowing through the fluid channel (6) to be heated, ready to be sent for beverage preparation.

After the hot beverage has been prepared, if a cold beverage is then required by the operator, the fluid channel (6) is already empty as the heating fluid (not shown) has been sent to and used for the beverage preparation. A cooling fluid (not shown) is then passed through the cooling channel inlet (14) and into the cooling channel (10). The cooling fluid (not shown) is initially at a temperature at no more than at ambient temperature and preferably no more than 25° C. and ensures that the cooling channel (10) temperature is below the temperature of the fluid channel (6). Consequently, residual heat in the material of the fluid channel (6), arranged adjacent and substantially spaced apart along the entire length of the cooling channel (10) is exchanged with the cooling channel (10), lowering the temperature of the fluid channel (6) and raising the temperature of the cooling fluid. In a subsequent cooling step, in order to reduce the temperature of the fluid channel (6) further, cooling fluid at a lower temperate of no more than 10° C. (and preferably at no more than 5° C.) is passed through the cooling channel (10) and further heat exchange between the fluid channel (6) and cooling channel (10) occurs. Subsequently, the cooled fluid channel (6), and hence the cooled FTH (1), is ready to receive a further amount of liquid (not shown) for the preparation of a cold beverage which flows thought the fluid channel inlet (12), the fluid channel (6) and finally comes out from the fluid channel outlet (16) for the cold beverage preparation.

Figure 4:
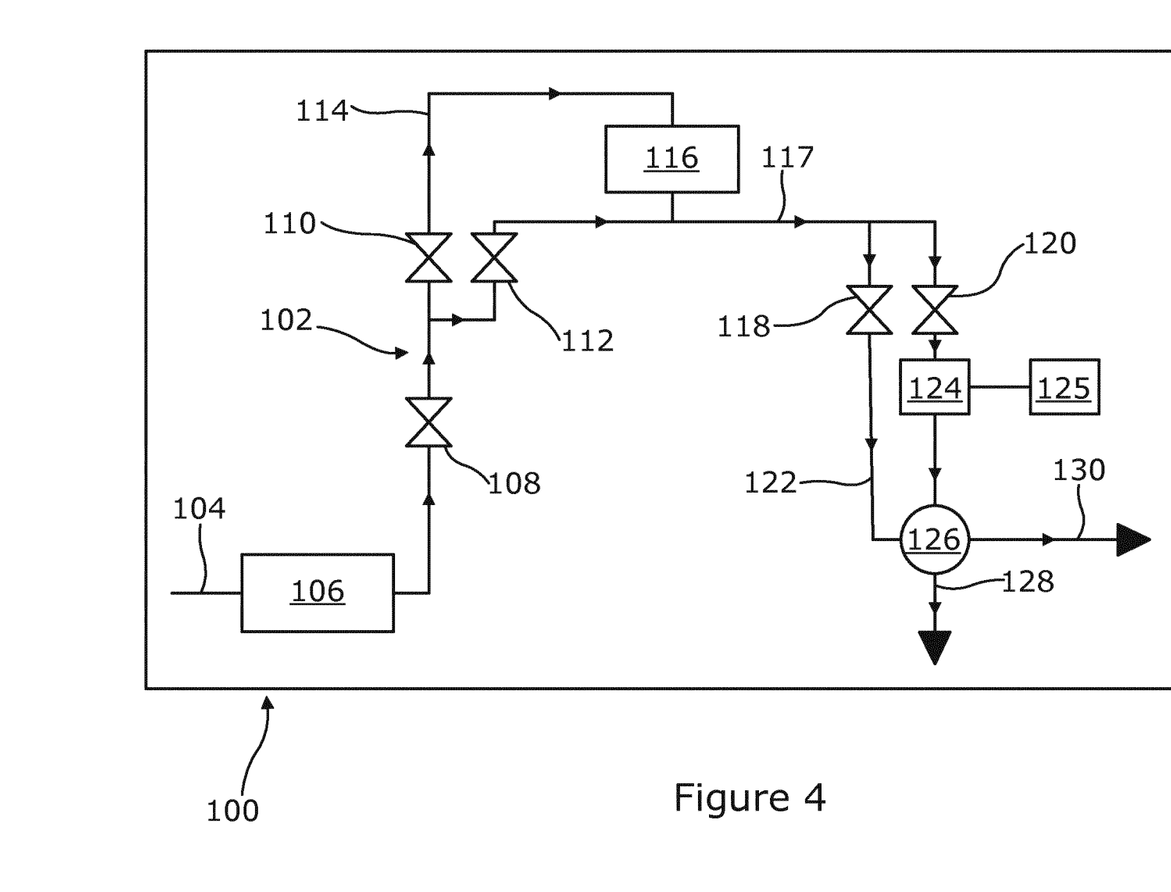
FIG. 4 illustrates a schematic of a flow diagram of a first embodiment of a beverage preparation apparatus according to the invention, without cooling fluid recycle.

We refer now to FIG. 4, which illustrates a schematic flow diagram of a first embodiment of a beverage preparation apparatus (100) according to the invention, without cooling fluid recycle.

The beverage preparation apparatus (100) comprises four main components: a water tank (106); a refrigerator (116); an ingredient chamber (124) and a heating device in the form of an FTH (126) of the invention. Each of the water tank (106), refrigerator (116), ingredient chamber (124) and FTH (126) are connected via a water circuit (102). The fluid circuit includes a number of conduits and valves as follows. A water inlet (104) enters the water tank (106); downstream of the water tank (106) is a main water valve (108); downstream of the main water valve (108) are a refrigerator circuit valve (110) and a refrigerator bypass valve (112); downstream of the refrigerator circuit valve (110) is a refrigerator flow conduit (114) which enters the refrigerator (116); downstream of the refrigerator bypass valve (112) is a beverage fluid conduit (117); downstream of the beverage fluid conduit (117) are a cooling water valve (118) and an ingredient mixer valve (120); the ingredient mixer valve (120) is connected to the ingredient mixing chamber (124), while downstream of the cooling water valve (118) is a cooled water conduit (122). Downstream of both the cooled water conduit (122) and the ingredient mixing chamber (124) is the FTH (126). A cooled water outlet (130) and a beverage outlet (128) are operably connected to the FTH (126).

Use of the beverage preparation apparatus (100) of FIG. 4 will now be described. Firstly, water enters the main water tank (106) via the water inlet (104). When it is desired for water to pass through the water circuit (102) the main water valve (108) is opened allowing flow downstream thereof.

When it is desired to prepare a hot beverage, the refrigerator circuit valve (110) is closed so that water cannot flow down the refrigeration flow conduct (114) into the refrigerator (116). At the same time, the refrigeration bypass valve (112) is opened and water flows through the beverage fluid conduit (117). The cooling water valve (118) is closed and the ingredient mixing valve (120) is opened and water flows into the ingredient mixing chamber (124), mixed with ingredients and then flows into the FTH and is heated in the FTH (126) and dispensed from the outlet (128). The beverage ingredients may be supplied from an ingredient tank (125) or may be present in a pod, capsule or the like, within the ingredient mixing chamber (not shown). Finally, the beverage exits the beverage outlet (128).

At this point the heated fluid channel within the FTH (126) is empty of beverage and heated fluid but retains residual heat from the hot beverage and fluid. If it is then desired to dispense a cold beverage through the FTH (126), the ingredient mixing valve (120) is closed, the cooling water valve (118) is opened, the refrigeration bypass valve (112) closed and the refrigerator circuit valve (110) opened such that water may flow through the refrigeration flow conduit (114), through the refrigerator (116) and the cooling water valve (118); wherein the water then flows through the cooled water conduit (122) and into the FTH (126). Within the FTH (126) the cooled water passes through the cooling channel and heat transfer occurs between the residual heat in the fluid channel and the cooling channel such that the fluid channel cools to no more than ambient temperature and preferably less than 10° C., whilst the cooled water within the cooling channel is warmed and transported out of the FTH (126) through the cooled water outlet (130).

A cold beverage may then be dispensed from the beverage apparatus (100) by transporting refrigerated water from the refrigerator (116), through the beverage fluid conduit (117), through the ingredient mixing valve (120) and passing the chilled water through the ingredient mixing chamber (124) and FTH (126), and finally through the beverage outlet (128).

As can be seen from the description above, the beverage apparatus (100) which incorporates a FTH (126) of the invention enables alternate hot and cold beverages to be dispensed through the same FTH (126) whilst ensuring that the cold beverage is not inadvertently heated by residual heat in any fluid channel of the FTH (126), thereby avoiding potentially imparting off flavours to the cold beverage or dispensing the cold beverage at a less than ideal temperature.

Figure 5:
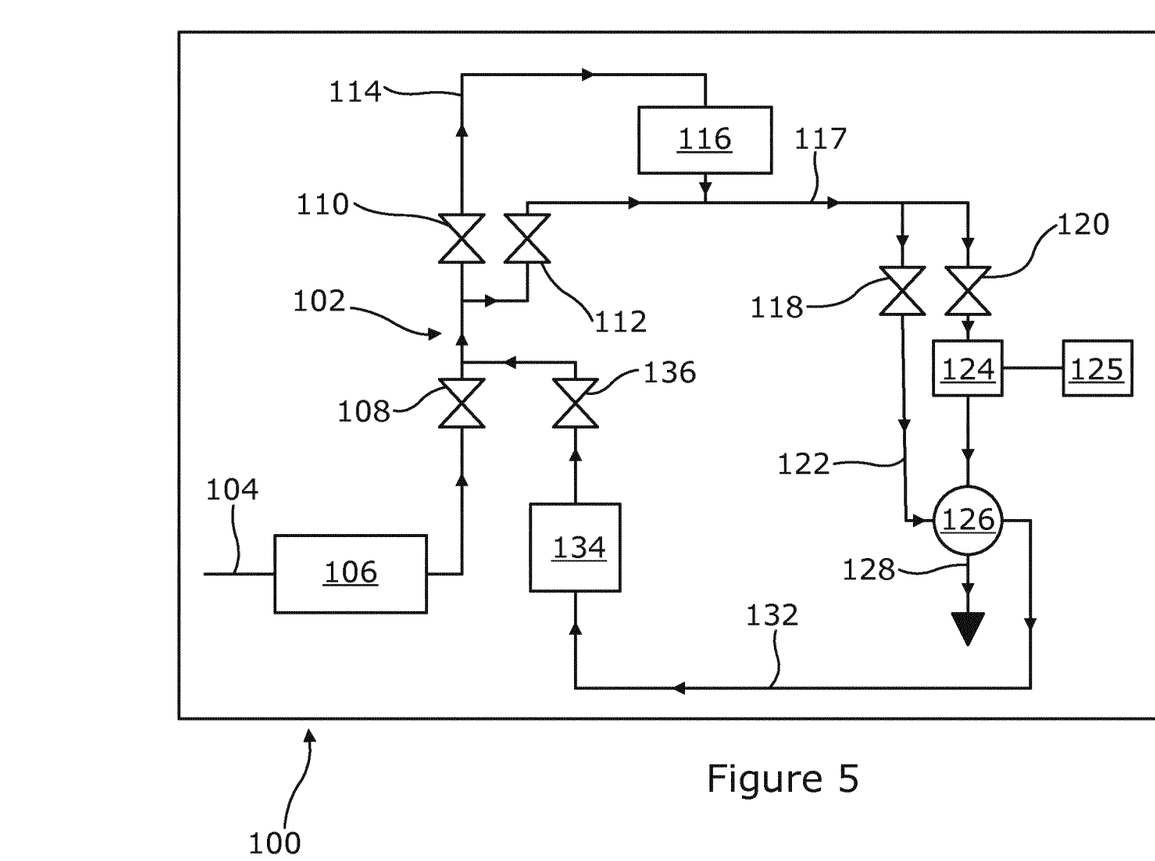
FIG. 5 illustrates a schematic of a flow diagram of a second embodiment of a beverage preparation apparatus according to the invention, with cooling fluid recycle.

We refer now to FIG. 5 which illustrates a second embodiment of a beverage preparation apparatus (100) of the invention. The beverage preparation apparatus (100) of FIG. 5 is similar to that described above for FIG. 4 and like numerals represent like components.

The beverage preparation apparatus (100) of FIG. 5 includes a fluid recycling circuit consisting of a cooling fluid recycling conduit (132) operably connected to the FTH (126); a water recycling tank (134), downstream of which is a recycled water valve (136) which enables or prevents flow of recycled water back into the fluid circuit (102) downstream of the main water valve (108).

Use of the beverage preparation apparatus (100) of FIG. 5 is very similar to that described hereinabove for the apparatus (100) of FIG. 4, save that cooled water which has passed through the FTH (126), and which has absorbed residual heat therein, and which is therefore warmed, maybe recycled and returned to the water circuit (102) as follows.

Firstly, heated cooling fluid exits the FTH (126) via the cooling fluid recycling conduit (132) and enters the water recycling tank (134). If desired, the recycled water valve (136) may then be opened to allow the heated and recycled cooling water to enter the water circuit (102) downstream of the main water valve (108). The heated recycled cooling water then mixes with water exiting the main water valve (108), thereby warming the overall water in the water circuit (102). The warmed water may then flow through the refrigeration bypass valve (112) and can be used in the FTH (126) where its higher temperature ensures that less energy is required to heat the water to any desired hot beverage temperature.

The water recycling tank (134) may be kept in the range 20° C., preferably 30° C. to 40° C. The recycling of heated cooling fluid allows the apparatus (100) to use less energy when a further hot beverage is required as the water temperature in the water recycling tank (134) is already raised to a higher temperature by the heat exchanged between the fluid channel and cooling channel within the FTH (126). This results in a more environmentally friendly apparatus (100).

Figure 6:
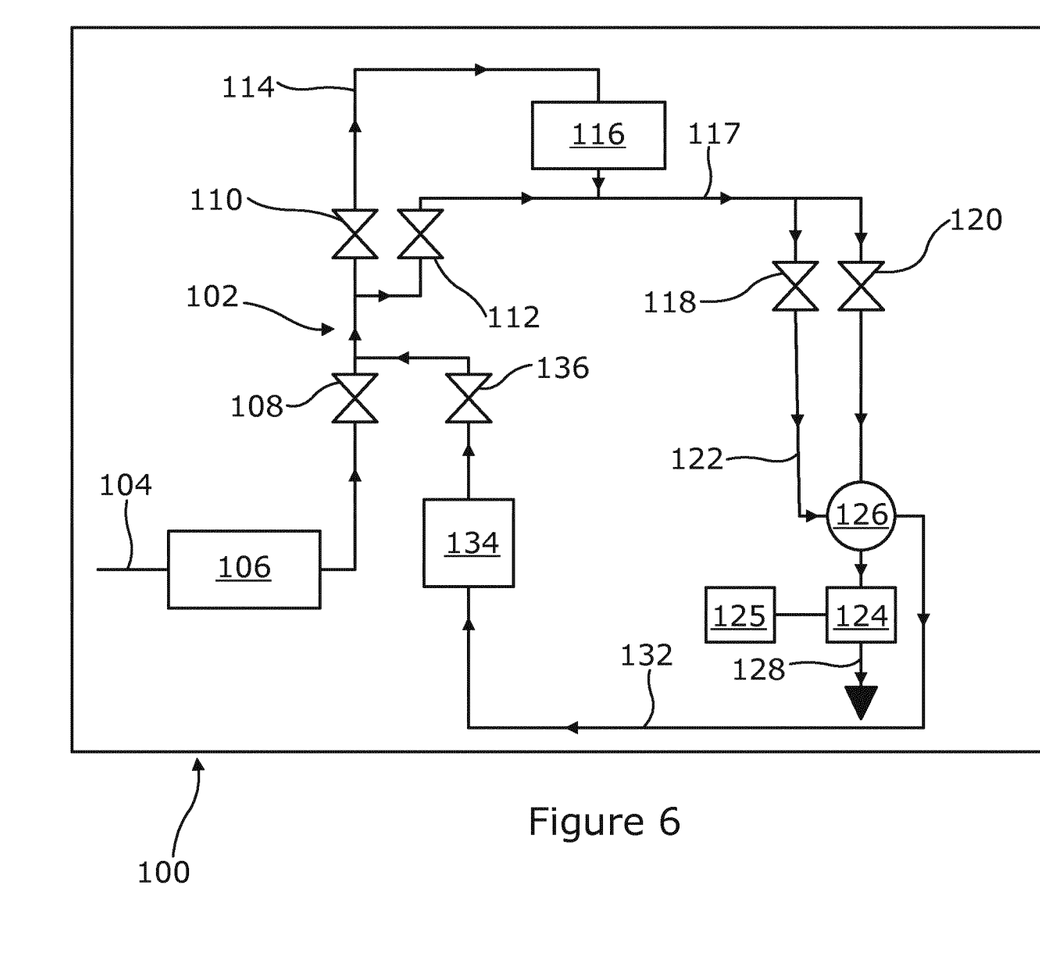
FIG. 6 illustrates a schematic of a flow diagram of a third embodiment of a beverage preparation apparatus according to the invention, with cooling fluid recycle.

Referring to FIG. 6, a third embodiment of the apparatus (100) of the invention is similar to the apparatus described above for FIGS. 4 and 5, and like numerals represent like components. In the apparatus (100) of FIG. 6, the ingredient mixing chamber (124) and ingredient tank (125) are located downstream of the FTH (126) and the ingredient mixing valve acts instead as a FTH valve (124). In this embodiment when it is desired to dispense a hot beverage the beverage fluid is passed through the FTH valve (124) and directly into the FTH (126) for heating, then the heated water flows into the ingredient mixing chamber (124) for mixing with ingredients. Ingredients may be supplied from the ingredient tank (125) and/or there may be a removable pod, capsule or other container within the ingredient mixing chamber (124) which includes at least some of the beverage ingredients. The embodiment of the apparatus (100) shown in FIG. 6 is particularly suitable for use in brewing and dispensing hot beverages such as coffee and tea, as heated water from the FTH (126) can be used to extract the coffee or tea ingredients and dissolve them in water before dispensing the beverage from the beverage outlet (128). The cooling of the FTH (126) and the recycling of warmed cooling fluid is performed in a similar manner to that described above for FIG. 4.

The use of pods, capsules or other containers, which include the beverage ingredients, is particularly useful as different beverages may be dispensed in sequence by changing the pods, capsules or containers. For example, hot coffee may be dispensed from a coffee pod or capsule and the capsule removed and replaced with a milk pod or capsule; the FTH (126) may then be cooled and refrigerated liquid passed through the FTH (126) and into the milk pod or capsule to dispense cold or cool milk.

The above embodiments are described by way of example only. Many variants are possible without departing from the scope of the invention as defined in the appended claims.

The invention claimed is:

1. A heating device comprising
a base structure comprising a fluid channel and a planar heating element, the planar heating element arranged in use to heat fluid within the fluid channel, the heating device further comprising a cooling means, arranged in use to cool the fluid channel, wherein the cooling means comprises a cooling channel, and wherein the cooling channel is separate from the fluid channel and arranged side by side with the fluid channel, wherein in use the cooling channel is configured to cool the fluid channel after heated fluid is dispensed from the fluid channel, wherein the base structure comprises a plate-like structure including a first side and a second side, with the fluid channel and the cooling channel integrally formed with the plate-like structure and positioned between the second side of the plate-like structure and the planar heating element.

2. A heating device according to claim 1 wherein the planar heating element at least partially matches a fluid channel path of the fluid channel.

3. A heating device according to claim 1 wherein the base structure comprises thermally conductive material through which heat is exchanged between the fluid channel and the cooling means.

4. A heating device according to claim 1 wherein at least part of the cooling channel is adjacent to at least one side of at least a part of the fluid channel.

5. A heating device according to claim 1 wherein at least part of the cooling channel is adjacent to at least two different sides of at least a part of the fluid channel.

6. A heating device according to claim 1 wherein at least part of the cooling channel abuts or contacts at least one side of at least a part of the fluid channel.

7. A heating device according to claim 6 wherein at least part of the cooling channel abuts or contacts at least two different sides of the at least a part of the fluid channel.

8. A method for cooling the fluid channel of a heating device according to claim 1 comprising the steps of:
   a. conveying heated fluid through the fluid channel; and
   b. using the cooling means to cool the fluid channel.

9. A method according to claim 8, wherein the method further comprises the step of conveying a cooling fluid through the cooling channel to cool the fluid channel via heat transfer.

10. A method according to claim 9 wherein the method further comprises the step of recycling the cooling fluid after the cooling fluid passes through the cooling channel.

11. A method according to claim 9 wherein the step of conveying the cooling fluid through the cooling channel comprises a first cooling step wherein the cooling fluid is at a temperature at no more than at ambient temperature.

12. A method according to claim 11 wherein the step of conveying the cooling fluid through the cooling channel further comprises a second cooling step wherein the cooling fluid is at a temperature of no more than 10° C. and below the temperature of the cooling fluid in the first cooling step.

13. A method according to claim 9 wherein the cooling fluid is recycled.

14. A method according to claim 9, wherein heat absorbed by the cooling fluid is used to heat a further fluid.

15. A beverage preparation apparatus comprising a heating device according to claim 1.

16. A beverage preparation apparatus according to claim 15 wherein the apparatus is a brewed beverage preparation apparatus.

17. A method of preparing one or more beverages comprising the steps of:

heating a beverage fluid in the fluid channel of the heating device of the beverage preparation apparatus according to claim 15;
ejecting the heated beverage fluid from the fluid channel;
cooling the fluid channel; and
optionally passing a further fluid through the fluid channel.

18. A heating device according to claim 6 wherein at least part of the cooling channel abuts or contacts opposite sides of the at least a part of the fluid channel.

19. A heating device according to claim 1 wherein the fluid channel comprises a fluid channel inlet and a fluid channel outlet, and the cooling channel comprises a cooling channel inlet and a cooling channel outlet.

20. A heating device according to claim 19 wherein the fluid channel inlet and fluid channel outlet are configured such that a direction of flow of the heated fluid within the fluid channel is perpendicular to a direction of flow of the heated fluid entering the fluid channel inlet and exiting the fluid channel outlet.

* * * * *